Figures 1, 2, 3, 4:
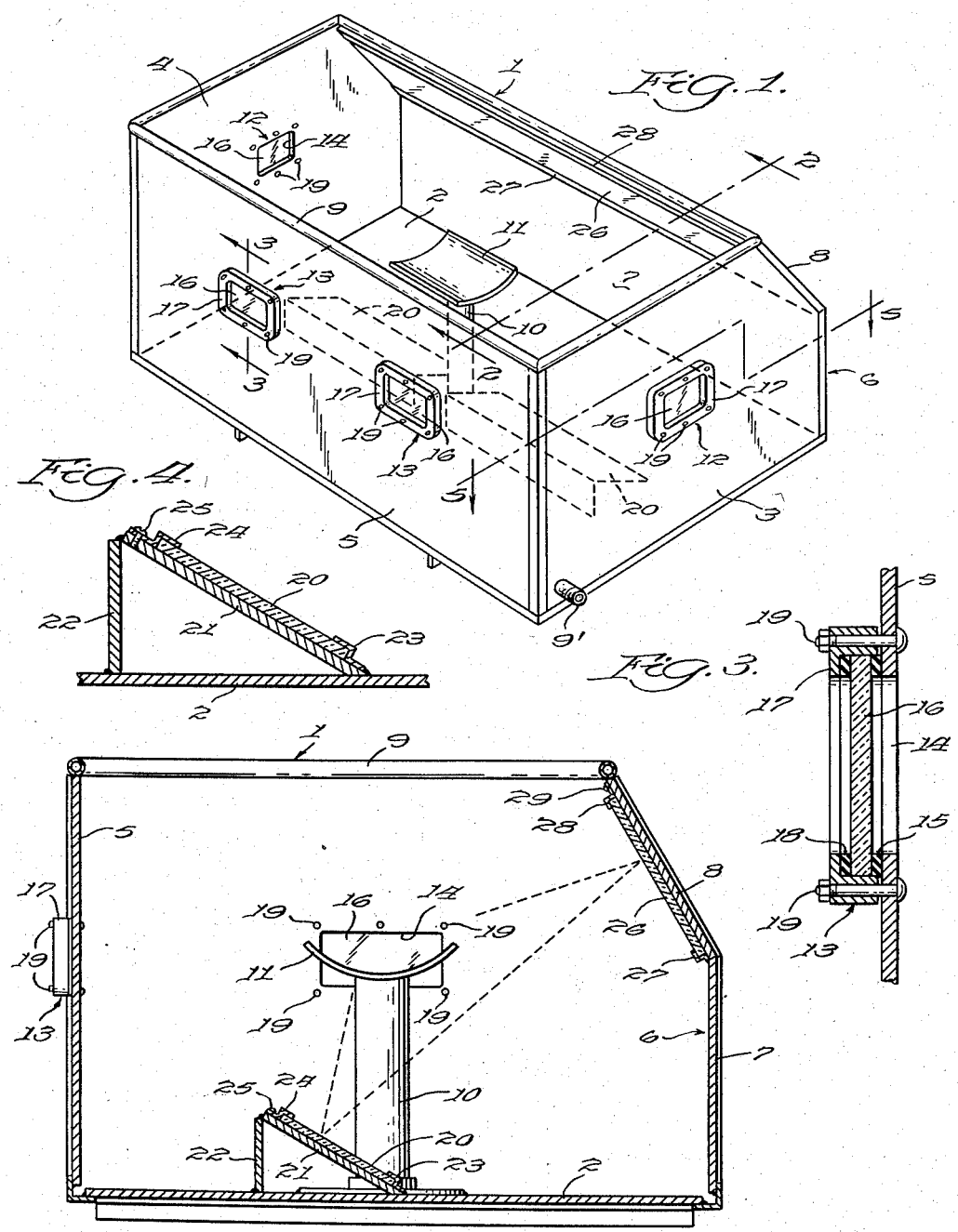

March 3, 1959 L. C. GARATE 2,875,528
SWIMMING INSTRUCTION DEVICE
Filed Dec. 12, 1956 2 Sheets-Sheet 1

Inventor:
Luis C. Garate.
By Harold J. LeVesconte
Atty.

March 3, 1959
L. C. GARATE
2,875,528
SWIMMING INSTRUCTION DEVICE
Filed Dec. 12, 1956
2 Sheets-Sheet 2
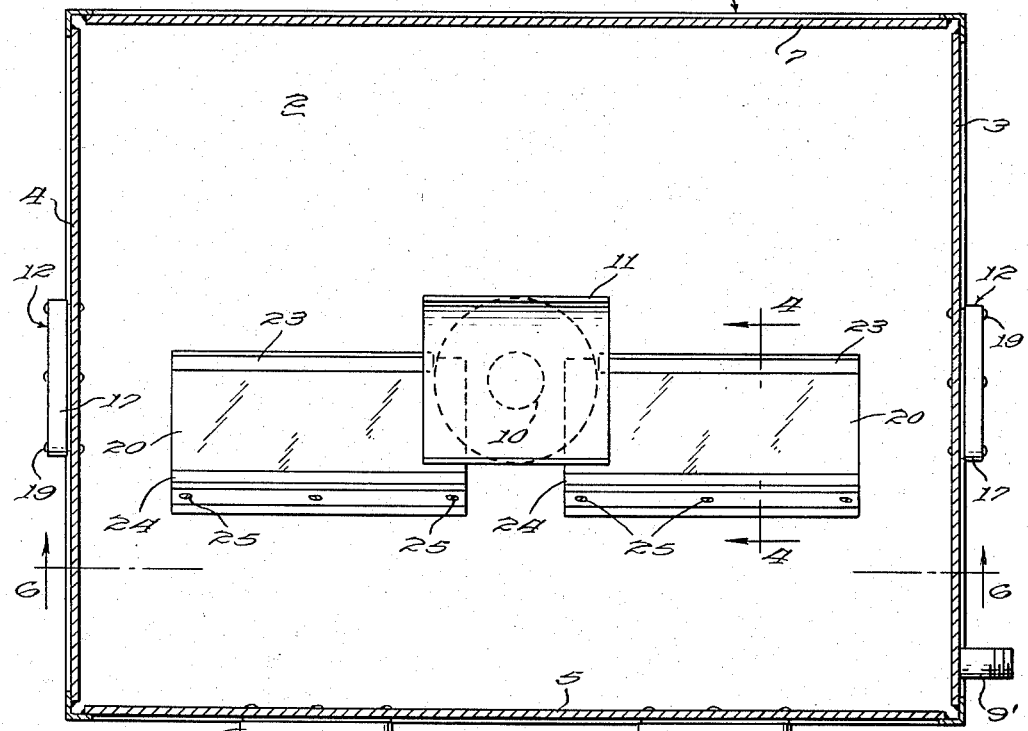
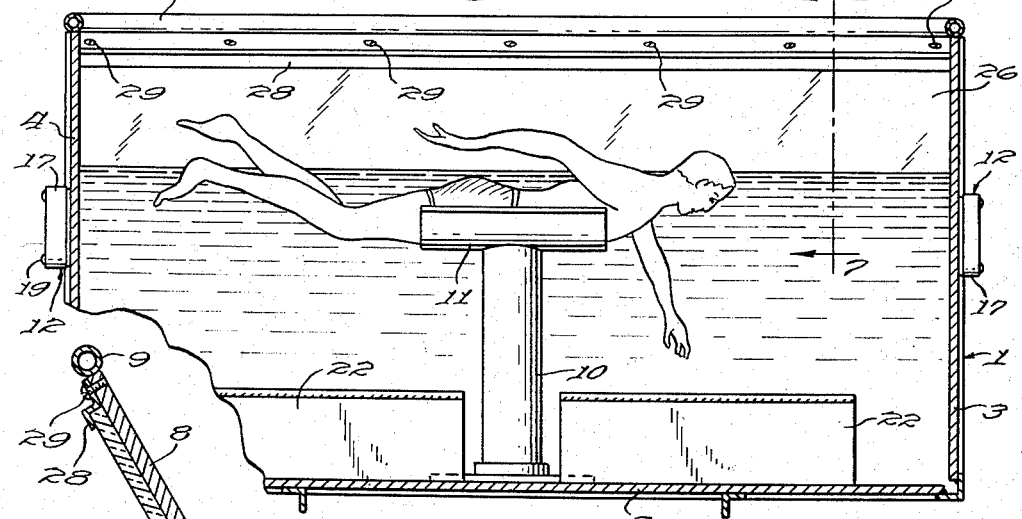
Inventor:
Luis C. Garate.
By Harold J. LeVesconte
Atty.

United States Patent Office 2,875,528
Patented Mar. 3, 1959

2,875,528

SWIMMING INSTRUCTION DEVICE

Luis C. Garate, Glendale, Calif.

Application December 12, 1956, Serial No. 627,770

4 Claims. (Cl. 35—29)

This invention relates to apparatus for teaching and learning swimming and more particularly to an improved means by which both the student and the instructor can observe the arm and leg actions and make the necessary corrections.

The primary object of the invention is to provide a means by which a swimming student is supported at the correct level in the water under conditions in which both the student and instructor may observe the arm and leg actions and correct any errors thus noted.

The specific object of the invention is to provide a tank to be filled with water; said tank having means for supporting a swimming student at a desired level therein and leaving the arms and legs of the student free to move; and further having a series of windows and a system of mirrors beneath the water level by which the instructor and student, respectively, may observe the arm and leg movements and make such correction as may be deemed necessary.

With the foregoing objects in view, together with such other objects and advantages as may subsequently appear, the invention resides in the parts, and in the construction, combination and arrangement of parts described, by way of example in the following specification of a presently preferred embodiment of the invention, reference being had to the accompanying drawings which form a part of said specification and in which drawings:

Fig. 1 is a top perspective view of a swimming instruction tank embodying the invention, Fig. 2 is an enlarged, transverse sectional view taken on the line 2—2 of Fig. 1, Fig. 3 is a further enlarged, fragmentary sectional view taken on the line 3—3 of Fig. 1, Fig. 4 is a further enlarged fragmentary sectional view taken on the line 4—4 of Fig. 5, Fig. 5 is a sectional plan view taken on the staggered line 5—5 of Fig. 1, Fig. 6 is a sectional side elevational view taken on the line 6—6 of Fig. 5 showing the apparatus in use, and Fig. 7 is an enlarged scale, fragmentary sectional view taken on the line 7—7 of Fig. 6.

The illustrated embodiment of the invention comprises a tank 1 generally rectangular as viewed in plan and being somewhat longer, deeper and wider than the area covered by a person executing swimming movements; said tank comprising a bottom 2, vertical end walls 3 and 4, a vertical side wall 5 and a side wall 6 comprising a lower vertical portion 7 and an upwardly and inwardly sloping upper portion 8. The tank may be of any desired construction, the illustrated embodiment being formed of welded metal plates. A tubing 9 welded to the upper edges of the wall members provides a smooth rounded edge for the top edges of the tank. Suitable means for filling and emptying the tank may be provided such as the nipple 9' extending into the tank through the end wall 3 and, if desired, a second such nipple can be provided so that filling and draining will occur through separate orifices.

Rising from the bottom of the tank at about the center thereof is a post 10 terminating at its upper end in a U-shaped saddle member 11 extending longitudinally of the tank and disposed at an elevation at which a swimmer resting thereon as shown in Fig. 6 is supported at a proper level in the water in the tank and in proper relation to certain mirrors and windows mounted in the tank.

Each end wall of the tank is provided with a window 12 disposed beneath the water level and the side wall 5 is also provided with a pair of windows 13, 13; said windows (see Fig. 3) comprising openings 14 in the walls bordered on the outer face thereof by a gasket 15 against which a glass 16 is compressed by a frame element 17 with a second gasket 18 interposed between the outer surface of the glass and the frame element and bolts 19 extending through the tank wall and frame element effective to form a leak proof joint between the glass and gaskets. Through these windows the instructor can observe the arm and leg actions of the student and thus be enabled to give advice or instructions relative thereto. Between the post 10 and each end wall of the tank is one each of a pair of mirrors 20, 20 supported on the bottom of the tank and inclined generally toward the sloping inner face of the tank wall portion 8. The supports for the mirrors 20, 20 (see Fig. 4) comprises a plate 21 supported along one edge thereof by the bottom of the tank and along the opposite edge by a vertical leg member 22 of sufficient height to position the plate at the desired angle; the said plate and leg being preferably welded in place. Extending along its lower edge, the plate 21 carries a modified Z-bar 23 positioned to extend along and overhang the lower edge of the plate with resultant formation of a glass receiving groove for the edge of the mirror 20. The upper edge of the plate 21 carries a similar Z-bar member 24 removably secured thereto by screws 25 effective to overlie the upper edge of the mirror 20 and to afford means for placement and removal of mirrors.

The inner face of the side wall portion 8 also carries a mirror 26 extending substantially the full length of the tank; said mirror being secured thereon by a fixed lower Z-bar member 27 and a removable upper Z-bar member 28 secured by screws 29 in the same manner as the mirrors 20.

The angles at which the mirrors 20 and 26 are placed are such that by looking downwardly into the mirror 20, the swimmer can observe the reflection in the mirror 26 of his arm action as viewed from the side and make such corrections in his stroke as are observed to be desirable. As shown in Fig. 6, the swimmer will observe the action or stroke of the right arm and by facing in the opposite direction in the tank, the stroke of the left arm can be observed. While the swimmer is thus observing his own performance, the instructor, coach or advisor may watch the performance through the windows and give advice or instructions based on those observations.

Thus, there has been provided an apparatus by which a swimmer may study his own form and be enabled to perfect it and by which an instructor or coach may observe the action as seen from under water and be enabled thereby to better advise or instruct the swimmer.

While in the foregoing specification there has been disclosed a presently preferred embodiment of the invention, it is not to be inferred therefrom that the invention is limited to the exact form thus disclosed by way of example, and it will be understood that the invention includes all such changes in the parts, and in the construction, combination and arrangement of parts as shall come within the purview of the appended claims.

I claim:

1. An apparatus for teaching and learning swimming comprising a container for water having length, width and depth dimensions sufficient to allow a student lying prone therein at the correct level with respect to the water level to partake of swimming movements without contact with the sides or bottom of the container, a supporting means in said container engageable with the torso of the student effective to support the student in a prone position at the said correct level, and means for enabling the student to observe his motions as viewed from the side; said means comprising a first mirror positioned beneath the water level at and parallel to the side of a student on said supporting means and inclined with respect to the vertical so as to project the reflected image of the submerged portion of the body of the student downwardly angularly along a line passing beneath the downward field of view of the student, and a second submerged mirror positioned in the said downward field of view of a student on said supporting means and in the line of said reflected image; said second mirror being angularly inclined to reflect the said reflected image from said first mirror into the said downward field of view of the student while so supported.

2. An apparatus as claimed in claim 1 in which the side walls forming said container are provided with windows disposed beneath the water level through which an instructor may observe the swimming movements of the student.

3. An apparatus as claimed in claim 1 in which said student supporting means comprises a support rising from the bottom of said container and terminating at its upper end in a saddle element on which the student lies.

4. An apparatus as claimed in claim 3 in which one of the side walls forming said container is provided with a window disposed beneath the water level through which an instructor may observe the swimming movements of the student.

References Cited in the file of this patent
UNITED STATES PATENTS

| | | |
|---|---|---|
| 149,249 | Redfearn | Mar. 31, 1874 |
| 563,578 | Emerson | July 7, 1896 |
| 2,215,396 | Hoyt | Sept. 17, 1940 |
| 2,297,844 | Shoemaker | Oct. 6, 1942 |
| 2,494,000 | Robertson | Jan. 10, 1950 |